May 31, 1949.    S. A. WEINBERG    2,471,466
CAKE AND PIE KNIFE
Filed Nov. 5, 1947
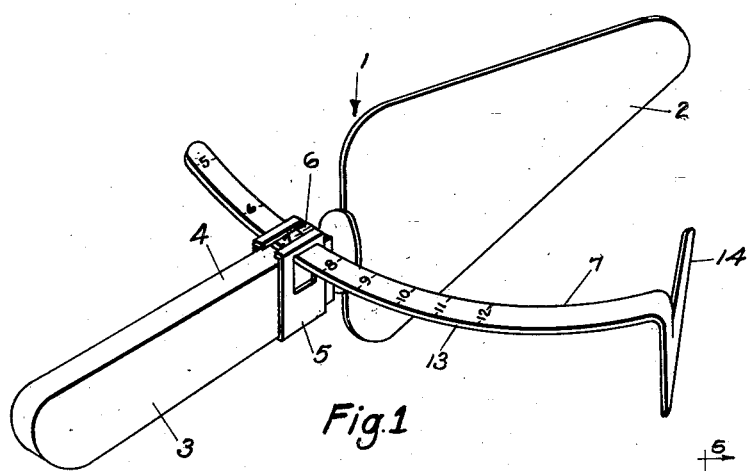
Fig.1
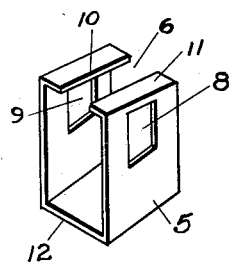
Fig.4
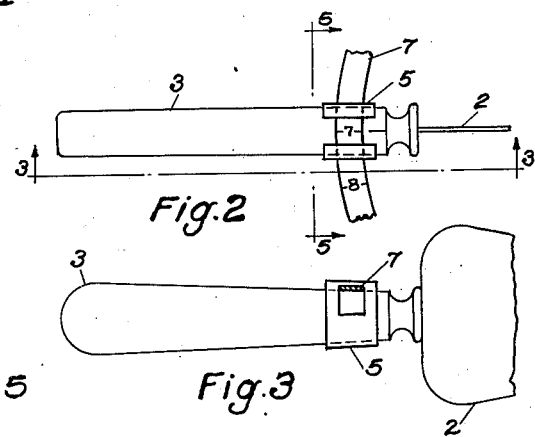
Fig.2
Fig.5
Fig.3
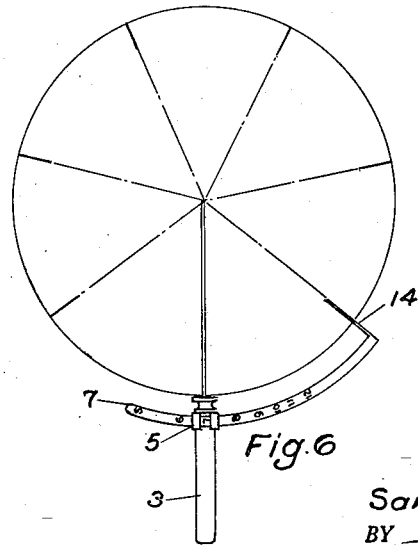
Fig.6
INVENTOR.
Samuel A. Weinberg
BY
his Attorney.

Patented May 31, 1949

2,471,466

UNITED STATES PATENT OFFICE 2,471,466

CAKE AND PIE KNIFE

Samuel A. Weinberg, Wollaston, Mass.

Application November 5, 1947, Serial No. 784,287

11 Claims. (Cl. 30—114)

The present invention relates to a pie or cake knife and, more particularly, to an improvement for such a knife whereby a round pie or cake, or one having a central symmetry, may be marked into sectors predetermined in size to divide the pie or cake into the desired number of pieces. The object of the present invention is to provide, in combination with a pie or cake knife, such a marking device, which may be readily adjusted and may also be readily removed so that the knife may be used in the ordinary manner or as a divider without the necessity of unscrewing parts involving the use of special means or the use of elements which may easily be misplaced or lost. The present invention is simple in construction, easy to clean, and adjustment is not only quickly and readily made, but without the necessity for removing or tightening nuts or screws and without any additional effects such as a screw driver or pliers.

Further, when the marking device is removed from the knife, the only thing which remains attached to the knife is a collar which may be firmly fixed in position so that it will not cause any inconvenience in using the knife. An ordinary pie or cake knife may be used, with the handle made of any desired material. A further advantage in the present invention is that no hole need be made through the handle of the knife and therefore the handle retains its full strength and no interference is had with the part of the blade which projects into the handle by means of which the blade is firmly held in position.

The invention will be more fully described in the specification annexed hereto when taken in connection with the drawing illustrating an embodiment thereof, in which:

Fig. 1 shows the invention as applied to a cake knife;

Fig. 2 shows a fragmentary plan view of the invention shown in Fig. 1;

Fig. 3 shows a fragmentary sectional view taken on the line 3—3 of Fig. 2;

Fig. 4 shows in perspective one element of the invention;

Fig. 5 shows a section taken on the line 5—5 of Fig. 2; and

Fig. 6 shows the invention as applied to a circular pie or cake.

In the drawings, the cake knife 1 is provided with a blade 2, of any of the usual types, set in a handle 3. The handle of the knife used in the present invention is preferably tapered lengthwise thereof. In the illustration shown, the taper is on the surfaces at right angles to the plane of the blade from the blade portion increasing backwards to the rear of the handle, although any flat, are closer together at the blade end of the knife than at the rear end of the knife, although the taper may be the other way. Other shaped surfaces for the handle of the knife may be used, providing there is a flat surface such as 4 and a tapering in one or the other direction. Surrounding the handle of the knife is a collar 5, which preferably is broken away at the top portion, either all the way across the collar as indicated in Fig. 4 or only part way across, providing an open segment or window 6, in which numbers such as indicated in Figs. 1 and 2 on the sector bar 7 show. The collar 5 is also provided with side slots or holes 8 and 9, just sufficiently wide to pass the sector or measuring bar 7. These slots extend upwards as viewed in Figs. 1 and 2, so that the space between the top surface 4 and the inner surfaces of the flanges 10 and 11 is sufficient to permit the bar 7 to be slid across between the surface 4 and the inner surfaces of the flanges when the collar is in a forward position on the handle 3. The collar 5 may be made of metal, metal which has some springiness in it, or plastic which also may have a yielding and restoring force. The collar 5 is shaped to fit the handle 3, particularly at its forward end, with the inner faces of the flanges 10 and 11 and the inner face of the opposite side 12 tapered with substantially the same taper as the surface 4 and its opposite surface. As the collar 5 is drawn backwards on the handle, it binds with the handle and clamps the flat measuring or sector bar firmly down on the surface 4. The sector bar 7 comprises a flat arcuate sector 13, on which numbers 5, 6, 7, 8, 9, 10, 11 and 12 are marked to indicate the number of sections into which the pie or cake is to be divided by radial segments, when the number is brought to register in the window 6.

In the illustration as indicated in Fig. 1, the pie will be marked off in seven segments as shown in Fig. 6. The blade of the radial projecting arm 14 of the bar 7 will divide the pie or cake into seven segments. If the bar is adjusted to bring the number 8 in register within the window, then the pie will be divided into eight segments. In the use of the device, the bar is inserted through the side slots 8 and 9 between the top surface 4 of the handle and the bottom surfaces 10 and 11 of the flanges, to bring the desired number in register in the window. The collar is then tightened by a backward movement to lock the bar in place. The operator then uses the blade as the guide to the center of the pie or cake, and brings it lightly down until the projecting arm 14 marks the pie. The blade is then moved on the pie to the position of the marking arm, with the blade directed at the center, and a second mark is made by the marking arm 14. This is repeated until the whole If, however, it is desired to cut the cake with the marking bar in place, this can readily be done without any great effort.

Having now described my invention, I claim:

1. In combination with a cake knife, means adjustably attached thereto having an adjustable arcuate bar with a marking arm projecting radially therefrom, and means including the handle of the knife for locking said arcuate bar in its desired position.

2. In combination with a cake knife provided with a handle having a surface tapering with respect to the rest of the handle and at right angles to the blade, a collar enclosing a part of the handle having a slot opening in the sides adjacent said tapering surface and an arcuate bar slidably adjustable through the slots and overlying said tapering surface, said collar fitting the handle with a close fit whereby movement along the handle in the direction of increasing taper will clamp the bar in a fixed position on said handle.

3. In combination with a cake knife provided with a handle having a surface tapering with respect to the rest of the handle and at right angles to the blade, a collar enclosing a part of the handle having a slot opening in the sides adjacent said tapering surface and an arcuate bar slidably adjustable through the slots and overlying said tapering surface, said collar fitting the handle with a close fit whereby movement along the handle in the direction of increasing taper will clamp the bar in a fixed position on said handle, said bar having an inwardly projecting radial member.

4. In combination with a cake knife provided with a handle having a surface tapering with respect to the rest of the handle and at right angles to the blade, a collar slidably fitting on the smaller part of the handle having an open segment overlying the tapering surface, said collar being provided with slots in its side faces adjacent the top face having the open segment, an arcuate bar passing through said slots and between the tapering surface and the top face of the collar, said bar being marked off in circular sectors and adapted to be clamped between the collar and the handle when the collar is forced in the direction of increasing thickness of the handle.

5. In combination with a cake knife having a handle with a rectangular cross section, two opposite surfaces of which taper towards one another in the vicinity of the blade, a collar fitting over the rectangular cross section of the handle having slots in the side faces parallel to the blade of the knife, an arcuate bar extending through the slots and lying between the top face of the handle and the inside face of the top of the collar at right angles to the blade, said collar fitting the handle so that when it is forced towards the larger portion thereof, the collar will clamp said bar in place.

6. In combination with a cake knife having a handle with a rectangular cross section, two opposite surfaces of which taper towards one another in the vicinity of the blade, a collar fitting over the rectangular cross section of the handle having slots in the side faces parallel to the blade of the knife and a window opening on the top face of the collar, an arcuate bar having graduations showing through the window in the top face of said collar, the bar extending through the slots and lying between the top face of the handle and the inside face of the top of the collar at right angles to the blade, said collar fitting the handle so that when it is forced towards the larger portion thereof, the collar will clamp said bar in place.

7. In combination with a cake knife having a handle with a rectangular cross section, two opposite surfaces of which taper towards one another in the vicinity of the blade, a collar having slots on the side faces thereof fitting over the handle with its top face terminating in inwardly projecting flanges leaving a space therebetween, an arcuate bar extending through the slots and lying between the top face of the handle and the inside face of the top of the collar at right angles to the blade, said collar fitting the handle so that when it is forced towards the larger portion thereof, the collar will clamp said bar in place.

8. In combination with a cake knife having a handle with a rectangular cross section, two opposite surfaces of which taper towards one another in the vicinity of the blade, a collar fitting over the rectangular cross section of the handle having slots in the side faces parallel to the blade of the knife, an arcuate bar extending through the slots and lying between the top face of the handle and the inside face of the top of the collar at right angles to the blade, said collar fitting the handle so that when it is forced towards the larger portion thereof, the collar will clamp said bar in place, said arcuate bar having an inwardly radially extending marking arm.

9. In combination with a cake knife having a handle with a rectangular cross section, two opposite surfaces of which taper towards one another in the vicinity and in the direction of the blade, a collar fitting over the rectangular cross section of the handle having slots in the side faces parallel to the blade of the knife, an arcuate bar extending through the slots and lying between the top face of the handle and the inside face of the top of the collar at right angles to the blade, said collar fitting the handle so that when it is forced towards the larger portion thereof, the collar will clamp said bar in place.

10. In combination with a cake knife having a handle with a rectangular cross section, two opposite surfaces of which taper towards one another in the vicinity of the blade, a spring collar fitting over the rectangular cross section of the handle having slots in the side faces parallel to the blade of the knife, an arcuate bar extending through the slots and lying between the top face of the handle and the inside face of the top of the collar at right angles to the blade, said collar fitting the handle so that when it is forced towards the larger portion thereof, the collar will clamp said bar in place.

11. In combination with a cake knife having a handle with a rectangular cross section, two opposite surfaces of which taper towards one another in the vicinity of the blade, a spring collar fitting over the handle with its top face terminating in inwardly projecting flanges leaving a space therebetween, an arcuate bar extending through the slots and lying between the top face of the handle and the inside face of the top of the collar at right angles to the blade, said collar fitting the handle so that when it is forced towards the larger portion thereof, the collar will clamp said bar in place.

SAMUEL A. WEINBERG.

No references cited.